United States Patent
Kaneko et al.

(10) Patent No.: US 8,113,960 B2
(45) Date of Patent: Feb. 14, 2012

(54) INTRODUCING SYSTEM, INTRODUCING METHOD, INFORMATION RECORDING MEDIUM, AND PROGRAM

(75) Inventors: Hiromasa Kaneko, Tokyo (JP); Hideo Ueda, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 200 days.

(21) Appl. No.: 12/596,348

(22) PCT Filed: Apr. 17, 2008

(86) PCT No.: PCT/JP2008/057483
§ 371 (c)(1),
(2), (4) Date: Oct. 16, 2009

(87) PCT Pub. No.: WO2008/133165
PCT Pub. Date: Nov. 6, 2008

(65) Prior Publication Data
US 2010/0114892 A1      May 6, 2010

(30) Foreign Application Priority Data

Apr. 20, 2007   (JP) .................................. 2007-112286

(51) Int. Cl.
*A63F 13/12* (2006.01)
(52) U.S. Cl. ................................ 463/42; 463/1; 707/737
(52) U.S. Cl. ..............................................................
(58) Field of Classification Search .................. 707/736, 707/737; 463/1, 42
See application file for complete search history.

(56) References Cited

U.S. PATENT DOCUMENTS

| | | | |
|---|---|---|---|
| 6,203,433 B1 * | 3/2001 | Kume | 463/42 |
| 7,076,434 B1 * | 7/2006 | Newnam et al. | 705/7.29 |
| 2008/0026810 A1 * | 1/2008 | Walker et al. | 463/17 |
| 2008/0032799 A1 * | 2/2008 | Hamilton et al. | 463/42 |
| 2009/0011830 A1 * | 1/2009 | Wang et al. | 463/29 |

FOREIGN PATENT DOCUMENTS

| | | |
|---|---|---|
| EP | 1 262 216 A2 | 12/2002 |
| JP | 2001-087559 | 4/2001 |
| JP | 2001-092891 | 4/2001 |

(Continued)

OTHER PUBLICATIONS

International Search Report dated Jul. 14, 2008.

(Continued)

*Primary Examiner* — Angela Lie
(74) *Attorney, Agent, or Firm* — Howard & Howard Attorneys PLLC

(57) ABSTRACT

Provided is an introducing system in which a server device introduces users of terminal devices to each other while motivating the users to join the system by presenting appropriate information to them during a wait time before they receive introduction. When a terminal device requests introduction of another terminal device during a time slot (303) shifted from a time period (304) between times $t_{i-1}$ and $t_i$ by a margin time period (305), the server device assigns an introduction time $t_i$ to the terminal device. The terminal device displays the difference between the assigned introduction time and the current time on a screen as a remaining wait time and the number of terminal devices in an introduction waiting list. When the time $t_i$ comes, the server device groups terminal devices that are assigned the introduction time $t_i$ to match an introduction target, and notifies the introduction target to each terminal device.

12 Claims, 6 Drawing Sheets

FOREIGN PATENT DOCUMENTS

| | | |
|---|---|---|
| JP | 2002-011251 | 1/2002 |
| JP | 2002-210249 | 7/2002 |
| JP | 2002-336554 | 11/2002 |
| JP | 2005-284495 | 10/2005 |
| JP | 2006-172201 | 6/2006 |
| JP | 2007-020843 | 2/2007 |
| TW | 553755 B | 9/2003 |

OTHER PUBLICATIONS

International Search Report.
Taiwanese Office Action with English Translation (Office Action mailed Oct. 12, 2011).

* cited by examiner

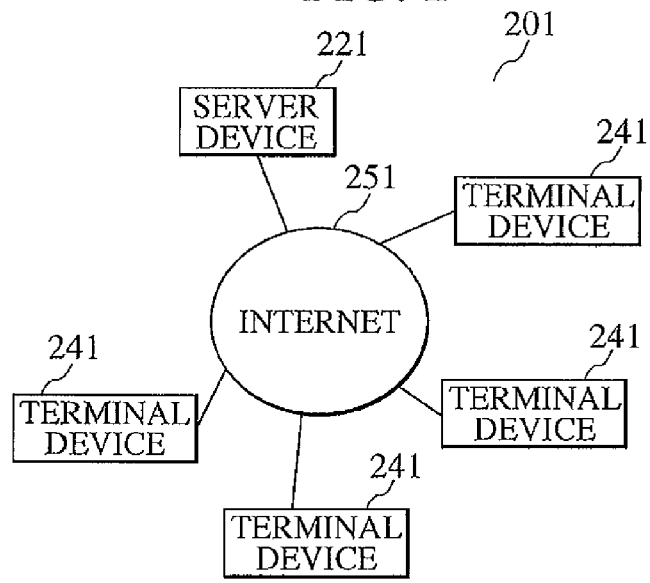
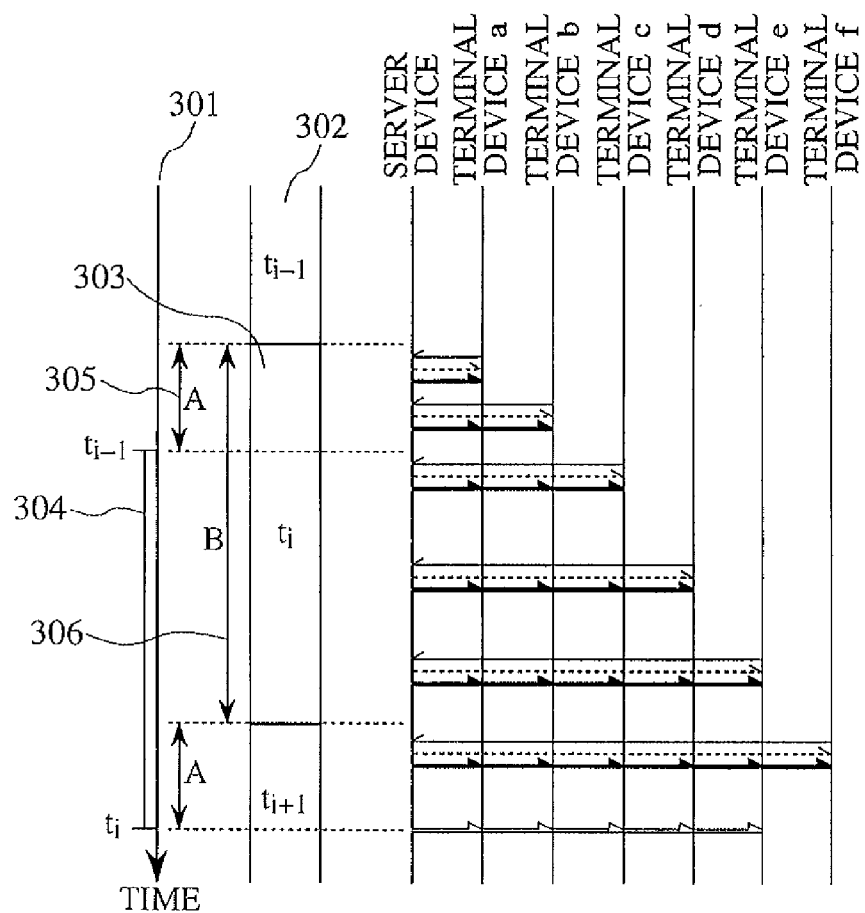

INTRODUCING SYSTEM, INTRODUCING METHOD, INFORMATION RECORDING MEDIUM, AND PROGRAM

RELATED APPLICATION

The present application is a national stage application of International Application Number PCT/JP2008/057483, filed Apr. 17, 2008.

TECHNICAL FIELD

The present invention relates to an introducing system and an introducing method for a server device to introduce users of terminal devices to each other while motivating the users to join the introducing system by presenting appropriate information to the users during the wait time before anyone is introduced to them, a computer-readable information recording medium storing a program for realizing these on a computer, and the program.

BACKGROUND ART

Conventionally, in online battle games, there have been provided techniques for users of terminal devices to connect their devices to a computer communication network such as the Internet and communicate with a server device called lobby server to ask the server device for introduction of an opponent, and for the server to match users who ask for introduction and introduce matching users to each other's terminal device to let the terminal devices introduced to each other communicate with and battle each other. Such introduction techniques are also called "matching" and used not only in online battle games but in systems for introducing users to each other.

Such a matching technique is disclosed in the below-identified literature. Patent Literature 1: Unexamined Japanese Patent Application KOKAI Publication No. 2002-210249

[Patent Literature 1] discloses a technique for an online game server device to assist a user in making friends, via online games, with someone with whom the user may click. According to this technique, the server device organizes a plurality of members who join a virtual party, generates a predetermined number of questions to be presented to the organized portable communication terminals, selects two members out of the party based on the information representing the answers to the generated questions and a compatibility evaluation parameter, lets the selected two members generate a predetermined number of questions and answer to the questions, allows an access time and a virtual place to be set based on the information representing the answers to the generated questions and a compatibility evaluation parameter, determines whether or not the two members have accessed the set virtual place at the set access time, and provides an e-mail box.

DISCLOSURE OF INVENTION

Problem to be Solved by the Invention

As can be seen, in matching, it is preferred that the members be matched as appropriately as possible with, for example, someone who is in the same level of skillfulness in games or someone who shares the same interest, etc. Therefore, it is necessary to pool a substantial number of users who request introduction, before actually matching users. Hence, users have to wait for a certain period of time before anyone is introduced to them after they have requested introduction.

Accordingly, there has been a strong demand for a technique that provides appropriate information so as not to demotivate users during the wait time in joining the introducing system to receive introduction of another user.

The present invention was made in view of the problem described above, and an object of the present invention is to provide an introducing system and an introducing method for a server device to introduce users of terminal devices to each other while motivating the users to join the introducing system by presenting appropriate information to the users during the wait time before anyone is introduced to them, a computer-readable information recording medium storing a program for realizing these on a computer, and the program.

Means for Solving the Problem

To achieve the above object, the following invention will be disclosed in accordance with the principle of the invention.

An introducing system according to a first aspect of the present invention includes a server device and a plurality of terminal devices. The server device and the terminal devices are capable of communicating with each other via a computer communication network, and configured as follows.

The server device includes an introduction information storage unit, an introduction time storage unit, an introduction request receiving unit, an introduction time deciding unit, an introduction information adding unit, an introduction response sending unit, a user information acquiring unit, a user report sending unit, an extracting/deleting unit, a grouping unit, an introduction report sending unit, and an introduction time updating unit.

Each of the plurality of terminal devices includes an introduction request sending unit, an introduction response receiving unit, a user report receiving unit, a display unit, and an introduction report receiving unit.

In the server device, the introduction information storage unit stores a user name of a user who requests introduction of another user and an introduction time at which an introduction should be presented to the user in association with each other.

A user name is typically an identification number or an IDentifier (ID) assigned to each user uniquely. An introduction time is a time at which an introduction is planned to be presented to the user who requests introduction of another user. An introduction time is a time that is behind the current time, unless there occurs an error such as that there is no one who can be introduced.

Since any correspondence to the user is necessarily transmitted via a terminal device, it is desired that communication identifiers such as an IP address, a port number, etc. of the terminal device used by the user be stored in association.

The introduction time storage unit stores a candidate time that is a candidate for the introduction time.

The candidate time is used as an introduction time to be assigned to any user who will request introduction next. Therefore, the candidate time is a time behind the current time.

Typically, the candidate time stored in the introduction time storage unit is incremental at predetermined unit temporal intervals (updated to future times).

In each of the plurality of terminal devices, the introduction request sending unit sends an introduction request that designates the user name of the user of the terminal device to the server device in accordance with an instruction of the user.

When a user wants another user to be introduced, he/she enters the wish into his/her terminal device by appropriately operating the terminal device. Then, the terminal device sends an introduction request to the server device. In a case where the terminal device is a portable phone or a game device, the user enters this input by various types of button or key operations. In a case where the terminal device is an ordinary computer, the user typically enters the input by various types of mouse operations.

In the server device, the introduction request receiving unit receives an introduction request sent by each of the plurality of terminal devices.

Since introduction requests are sent in accordance with instructions of the users, these introduction requests usually arrive at the server device at dispersed times.

When an introduction request is received, the introduction time deciding unit decides the introduction time at which an introduction should be presented to the user having the user name designated in the introduction request, to be the candidate time stored in the introduction time storage unit.

That is, the candidate time stored in the introduction time storage unit is used as the introduction time for the user who has newly requested introduction.

When the introduction time is decided, the introduction information adding unit additionally stores the user name and the introduction time in association with each other in the introduction information storage unit.

At this time, it is typical that the communication identifiers (an IP address, a port number, etc.) of the terminal device that has sent the introduction request in which the user name is designated are also stored in association in the introduction information storage unit.

The introduction response sending unit sends an introduction response that designates the decided introduction time to the terminal device that has sent the introduction request.

In this way, each terminal device can be notified of the time at which the user of the terminal device can receive an introduction.

The user information acquiring unit acquires the number of user names stored in the introduction information storage unit, when the introduction information storage unit is updated.

The introduction information storage unit is updated when the server device is requested by a new user for introduction. Therefore, when the server device receives an introduction request, the number of users who are currently waiting for introduction can be acquired.

The user report sending unit sends a user report that designates the acquired number of user names to each terminal device, among the plurality of terminal devices, that is used by any user having the user name stored in the introduction information storage unit.

Therefore, each terminal device that is currently in the introduction waiting list can be notified of the number of users who are currently in the introduction waiting list.

In each of the plurality of terminal devices, the introduction response receiving unit receives the introduction response sent by the server device, and the user report receiving unit receives the user report sent by the server device.

The introduction response is a response to the introduction request sent by the terminal device. The user report is sent to the user by the server device while the user is waiting for introduction, specifically when any other user newly requests introduction.

The display unit displays the difference between the introduction time designated in the received introduction response and the current time until the current time becomes the introduction time.

Therefore, because the user of the terminal device can confirm the wait time before he/she receives an introduction on the display screen, he/she can be kept motivated to join the introducing system.

When the user report is received and in a case where a predetermined user report display condition is satisfied, the display unit further displays the number of user names designated in the user report.

Hence, the user of the terminal device can confirm the number of the other users in the introduction waiting list during the wait time before receiving an introduction. Therefore, the user can feel a bond to the other users and expect that out of many users, a user who matches him/herself would be introduced.

The user report display condition of various types may be possible, as will be described later.

In the server device, the extracting/deleting unit extracts from the introduction information storage unit user names whose associated introduction time is equal to or behind the current time among the user names stored in the introduction information storage unit, and deletes the extracted user names from the introduction information storage unit.

The users extracted here are those whom an introduction should be presented right away. Unless there occurs an error such as an impossibility of introduction, the users whose introduction time is equal to or behind the current time should have the same introduction time as each other.

In the extraction, the extracted users are deleted from the introduction information storage unit, which is thus updated. Therefore, a user report will be sent to each terminal device.

The grouping unit classifies the extracted user names into one or a plurality of group(s).

The users having the user names included in each group are the matched users, who are to be introduced to each other. In online battle games, online go games, online shogi games, online chess games, etc., each match is typically fought between one player on one side and one player on the other side. In dating games and e-pal finding games, it is typical that a person and another person are introduced to each other. Therefore, in these cases, the number of users included in each group is two. In online mah-jong games, etc., four players confront one another. Therefore, the number of users included in each group is four. As obvious from this, it is possible to appropriately change the number of user names included in each group depending on the purpose.

The introduction report sending unit sends to each of the terminal devices used by the users having the user names that belong to the classified one group or any of the plurality of classified groups, an introduction report that designates the user names of another or the other user(s) belonging to that group.

Hence, each terminal device receives introduction of another user. Here, the introduction report typically designates not only the user name but also the communication identifiers (an IP address, a port number, etc.) of the terminal device used by that user.

In each of the plurality of terminal devices, the introduction report receiving unit receives the introduction report sent by the server device.

Hence, the terminal device and the user of the terminal device can be notified of the user name introduced by the server device. Afterwards, the terminal device will perform various communications by using the user name. The manner of the communications will be described later.

In the server device, when the current time becomes a time that is ahead of the candidate time stored in the introduction time storage unit by a predetermined margin time period, the introduction time updating unit updates the candidate time to a time that is behind by "a predetermined interval time period that is longer than the margin time period".

The "interval time period" represents a temporal interval at which introduction (grouping or matching) is performed. In a case where introduction is performed once in each minute (at sixty-second intervals), the interval time period is sixty seconds.

The "margin time period" is for making someone unable to receive an introduction at a coming introduction time, even though he/she has requested introduction before that introduction time comes.

In a case where the margin time period is fifteen seconds, the introduction time to be assigned to a user who requests introduction during a time period from a time "m" minute 0 second to a time "m" minute 45 seconds is a time "m+1" minutes 0 second, while the introduction time to be assigned to a user who requests introduction during a time period from a time "m" minute 45 seconds to a time "m+1" minutes 0 second is a time "m+2" minutes 0 second.

Hence, the wait time for which each user will wait before receiving an introduction ranges from fifteen seconds (margin time period) to seventy-five seconds (the sum of the margin time period and the interval time period).

In this way, it can be expected that the number of users joining the introducing system, i.e., the number of user names stored in the introduction information storage unit is always equal to or greater than "approximately fifteen (margin time period)/sixty (interval time period), i.e., one fourth of the number of users who receive introduction once in any arbitrary minute".

An introducing system of this kind is not free from a phenomenon that the number of users who request for introduction remains zero, because some users might give up using the introducing system if the number of other users who request introduction is zero when they request introduction.

By setting the interval time period and the margin time period appropriately, the present invention secures as many users as possible in the introduction waiting list before any user requests introduction to make it harder for such a situation to occur. Therefore, the present invention can intrigue users.

In each of the plurality of terminal devices, the predetermined user report display condition is satisfied in a case where the current time is after when the introduction response is received, and besides, the current time is before the introduction time designated in the received introduction response.

That is, in accordance with the present invention, the number of users who are currently in the introduction waiting list is displayed on a display screen from when an introduction request is received by the server device until the user actually receives an introduction.

Hence, the user can confirm the number of other users who are the candidates to be introduced to him/herself, and be whipped up about introduction of a user.

In this way, in accordance with the present invention, the introducing system in which the server device introduces users of terminal devices to each other can intrigue and motivate each user into joining the introducing system, by presenting information about the total number of users currently in the introduction waiting list to each user during the wait time before receiving an introduction, and by using some skill in deciding the introduction time for each user so as not to make the total number of other users in the introduction waiting list zero.

In the introducing system according to the present invention, the server device may further include a user information storage unit, which may be configured as follows.

The user information storage unit stores a user name and user information about a user having the user name in association with each other. "User information" includes, for example, a handle name or a nickname of the user, an avatar image, etc. Additionally, in the case of an online battle game, user information may include the win-loss record or the level of the user, his/her favorite technique, his/her equipment, etc. In the case of a friend matching game, user information may include the user's hobby, the type of the other sex whom the user likes, the user's favorite food, etc.

The user information acquiring unit further acquires user information stored in the user information storage unit in association with the user name designated in the received introduction request. The user report sending unit sends the user report by further designating therein the acquired user information.

In each of the plurality of terminal devices, the display unit further displays the user information designated in the user report, when the user report is received.

Hence, each user can check information about the user who has newly requested introduction.

In accordance with this mode of the invention, when another user requests introduction during the wait time, information about that user is displayed on a screen in real time. Therefore, it is possible to intrigue and motivate the user into joining the introducing system.

The introducing system according to the present invention may be configured as follows.

That is, in the server device, the grouping unit acquires user information that is stored in the user information storage unit in association with each user name that belongs to the classified one group or any of the plurality of classified groups, and determines a rank of the user names belonging to that group based on the acquired user information. The introduction report sending unit sends the introduction report by further designating therein all the user names belonging to that group and the rank of the user names.

This mode of the invention is for an embodiment in which a battle between users who have requested introduction is performed in the server device based on the user information stored in the server device. In a case where the number of user names included in a group is two, the win and the loss of these users are determined based on their rank.

It is possible to employ various ranking methods depending on the rules of the games, such as comparing parameters stored in association with the user names, such as attributes, a level, past achievements, owned items, etc. with an appropriate weight applied, deciding a win or a loss by using a random number, etc.

In each of the plurality of terminal devices, the display unit further displays all the user names and the rank of the user names that are designated in the introduction report sent by the server device.

Hence, each user can receive introduction of a battle opponent, and at the same time, know the result of the battle.

This mode of the invention is for a preferred embodiment of the invention described above, in which an online battle is performed in the server device based on appropriate matching.

In the introducing system according to the present invention, each of the plurality of terminal devices may further include a communication unit, which may be configured as follows.

That is, the communication unit communicates with the terminal device, among the plurality of terminal devices, that is used by the user having the user name designated in the received introduction report.

As described above, an introduction report typically designates not only a user name, but also the communication identifiers of the terminal device of the user having that user name. Based on these communication identifiers, peer-to-peer communication that is not relayed by the server device is performed so that communications such as an online battle and a chat may be performed.

As described above, it is typical that the communication identifiers of a terminal device and a user name are processed collectively. Therefore, the communication identifiers of a terminal device may be regarded as a user name.

This mode of the invention is for a preferred embodiment of the invention described above, in which an online battle is performed via peer-to-peer communication based on appropriate matching or a chat is performed based on appropriate matching.

In the introducing system according to the present invention, in the server device, the user information acquiring unit may acquire the number of user names stored in the introduction information storage unit that is counted for each introduction time stored in the introduction information storage unit. The user report sending unit may send to each terminal, among the plurality of terminal devices, that is used by any user having the user name stored in the introduction information storage unit, a user report that designates the acquired number of user names that is counted for the introduction time associated with the user name of that user.

In the invention described above, the number of user names stored in the introduction information storage unit, i.e., the total number of users in the introduction waiting list is displayed on the terminal device. The total number of users may greatly decrease at a timing at which introduction is performed. Accordingly, the total number of users displayed on the screen may greatly decrease.

Such fluctuation of the number may sometimes be desirable because users can feel that the introducing system is really operating. However, depending of the purpose of application, if the number of other users as the candidates to be introduced does not decrease, it may be more desirable because the users may be kept interested.

This mode of the invention is suitable for such a situation, and displays the total number of users who will receive an introduction at the same introduction time as the user of each terminal device on the screen.

In accordance with this mode of the invention, each user can know not the total number of users currently in the introduction waiting list, but the number of users as the candidates who may actually be introduced to him/her. By arranging that the number of users to be displayed on the screen is constantly in the increasing trend, it is possible to intrigue and motivate each user into joining the introducing system.

In the introducing system according to the present invention, in each of the plurality of terminal devices, the predetermined user report display condition may be satisfied in a case where the current time is after when the introduction response is received, besides the current time is before the introduction time designated in the received introduction response, and still besides the difference between the introduction time designated in the received introduction response and the current time is equal to or smaller than the difference between the interval time period and the margin time period.

In the invention described above, the number of users is displayed on the terminal device when an introduction response is received. In accordance with this mode of the invention, the number of users is displayed on the screen in a case where (a) an introduction request has been received, (b) an introduction has not yet been presented, and (c) the difference between the introduction time and the current time is equal to or smaller than the difference between the interval time period and the margin time period.

To explain this in the example described above, if a user requests introduction during a time period from a time "m" minute 0 second to a time "m" minute 45 seconds, the number of users is displayed on his/her screen during a time period from a time "m" minute 0 second to a time "m+1" minutes 0 second, i.e., from when the user requests introduction until he/she receives an introduction.

Meanwhile, if a user requests introduction during a time period from a time "m" minute 45 seconds to a time "m+1" minutes 0 second, the number of users is displayed on his/her screen during a time period from a time "m+1" minutes 0 second to a time "m+2" minutes 0 second. Therefore, the user may not be able to have the number of users displayed on his/her screen for fifteen minutes (margin time period) at a maximum.

The period during which the number of users is not displayed on the screen includes a timing at which it is assumed that the total number of users decreases because introduction is performed, or a timing at which it is assumed that the number of users for whom introduction is performed next is not large enough yet. Hence, it might be better not to display the number of users counted at these timings (the total number of users in the introduction waiting list or the number of users who are the candidates to be introduced in the next introduction to be performed for any user) on the screen.

In accordance with this mode of the invention, it is possible to intrigue and motivate each user into joining the introducing system, by appropriately stopping displaying information about the number of users that might make each user less interested in the introducing system.

In the introducing system according to the present invention, in each of the plurality of terminal devices, the predetermined user report display condition may be satisfied in a case where the current time is after when the introduction response is received, besides the current time is before the introduction time designated in the received introduction response, and still besides the number of user names designated in the user report is equal to or larger than a predetermined minimum number.

This mode of the invention is for a preferred embodiment of the invention described above, in which the number of users is not displayed on the screen until the number of users becomes equal to or larger than a predetermined minimum number.

In accordance with this mode of the invention, it is possible to intrigue and motivate each user into joining the introducing system, by appropriately stopping displaying information about the number of users that might make each user less interested in the introducing system.

In the introducing system according to the present invention, when the number of user names, among the user names stored in the introduction information storage unit, whose associated introduction time is the candidate time stored in the introduction time storage unit exceeds a predetermined first threshold, the introduction time updating unit may update the candidate time to a time that is behind the current time by the predetermined interval time period.

In the example described above, the interval time period and the interval between the timings at which introduction is performed are equal. However, in accordance with this mode of the invention, since the candidate time is updated when a necessary number of users for performing introduction are pooled, the interval between the timings at which introduction is actually performed is assumed to be shorter than the interval time period.

In accordance with this mode of the invention, it is possible to intrigue and motivate each user into joining the introducing system by making the introduction wait time as short as possible in a case where the number of users joining the introducing system is sufficiently large.

In the introducing system according to the present invention, in a case where the number of user names, among the user names stored in the introduction information storage unit, whose associated introduction time is a closest time that is ahead of and closest to the candidate time stored in the introduction time storage unit exceeds a predetermined first threshold, and besides the number of user names, among the user names stored in the introduction information storage unit, whose associated introduction time is the candidate time stored in the introduction time storage unit exceeds a predetermined second threshold, the introduction time deciding unit may decide the introduction time at which an introduction should be presented to the user having the user name designated in the introduction request, to be the closest time instead of the candidate time stored in the introduction time storage unit.

Here, the first threshold represents a number of users that is sufficient for performing introduction grouping, and the second threshold represents a smallest number of users that is expected not to demotivate the users when displayed on the screen. In this mode of the invention, two introduction times are assumed. When the earliest introduction time of the two has not yet come and in a case where there are a certain number of or more users to whom the latest introduction time of the two is assigned, not the candidate time but the introduction time (closest time) that is ahead of and the closest to the candidate time is used as the introduction time.

The closest time is a time ahead of the candidate time, and there are pooled a certain number of or more users to whom the closest time is designated as the introduction time. Hence, by deciding not the candidate time but its closest time as the introduction time, it is possible for the users to receive an introduction in a proportionately shorter wait time.

In accordance with this mode of the invention, it is possible to intrigue and motivate each user into joining the introducing system by making the introduction wait time as short as possible in a case where the number of users joining the introducing system is sufficiently large.

An introducing method according to another aspect of the present invention is performed by a server device and a plurality of terminal devices. The server device and the terminal devices are capable of communicating with each other via a computer communication network, and configured as follows.

That is, the server device includes an introduction information storage unit and an introduction time storage unit, and typically includes an introduction request receiving unit, an introduction time deciding unit, an introduction information adding unit, an introduction response sending unit, a user information acquiring unit, a user report sending unit, an extracting/deleting unit, a grouping unit, an introduction report sending unit, and an introduction time updating unit.

Each of the plurality of terminal devices typically includes an introduction request sending unit, an introduction response receiving unit, a user report receiving unit, a display unit, and an introduction report receiving unit.

The introducing method includes an introduction request sending step, an introduction request receiving step, an introduction time deciding step, an introduction information adding step, an introduction response sending step, a user information acquiring step, a user report sending step, an introduction response receiving step, a user report receiving step, a displaying step, an extracting/deleting step, a grouping step, an introduction report sending step, an introduction report receiving step, and an introduction time updating step.

In the server device, the introduction information storage unit stores a user name of a user who requests introduction of another user and an introduction time at which an introduction should be presented to the user in association with each other, and the introduction time storage unit stores a candidate time that is a candidate for the introduction time.

In each of the plurality of terminal devices, at the introduction request sending step, typically the introduction request sending unit sends an introduction request that designates the user name of the user of the terminal device to the server device in accordance with an instruction of the user.

In the server device, at the introduction request receiving step, typically the introduction request receiving unit receives the introduction request sent by each of the plurality of terminal devices. When the introduction request is received, at the introduction time deciding step, typically the introduction time deciding unit decides the introduction time at which an introduction should be presented to the user having the user name designated in the introduction request, to the candidate time stored in the introduction time storage unit. When the introduction time is decided, at the introduction information adding step, typically the introduction information adding unit additionally stores the user name and the introduction time in association with each other in the introduction information storage unit. At the introduction response sending step, typically the introduction response sending unit sends an introduction response that designates the decided introduction time to the terminal device that has sent the introduction request.

When the introduction information storage unit is updated, at the user information acquiring step, typically the user information acquiring unit acquires the number of user names stored in the introduction information storage unit. At the user report sending step, typically the user report sending unit sends a user report that designates the acquired number of user names to each terminal device, among the plurality of terminal devices, that is used by any user having the user name stored in the introduction information storage unit.

In each of the plurality of terminal devices, at the introduction response receiving step, typically the introduction response receiving unit receives the introduction response sent by the server device. At the user report receiving step, typically the user report receiving unit receives the user report sent by the server device. At the displaying step, typically the display unit displays the difference between the introduction time designated in the received introduction response and the current time until the current time becomes the introduction time. When the user report is received and in a case where a predetermined user report display condition is satisfied, the display unit further displays the number of user names designated in the user report.

In the server device, at the extracting/deleting step, typically the extracting/deleting unit extracts from the introduction information storage unit user names, among the user names stored in the introduction information storage unit, whose associated introduction time is equal to or behind the current time, and deletes the extracted user names from the introduction information storage unit. At the grouping step, typically the grouping unit classifies the extracted user names into one or a plurality of group(s). At the introduction report sending step, typically the introduction report sending unit sends to each terminal device that is used by any user having the user name that belongs to the classified one group or any of the plurality of classified groups, an introduction report that designates the user name(s) of another or the other user(s) belonging to that group.

In each of the plurality of terminal devices, at the introduction report receiving step, typically the introduction report receiving unit receives the introduction report sent by the server device.

In the server device, when the current time becomes a time that is ahead of the candidate time stored in the introduction time storage unit by a predetermined margin time period, at the introduction time updating step, typically the introduction time updating unit updates the candidate time to a time that is behind by a predetermined interval time period that is longer than the margin time period.

In each of the plurality of terminal devices, the predetermined user report display condition is satisfied in a case where the current time is after when the introduction response is received, and besides, the current time is before the introduction time designated in the received introduction response.

A program according to another aspect of the present invention includes a server program and a terminal program. The server program controls a server computer to function as the server device described above. The terminal program controls a terminal computer to function as the terminal device described above.

The program according to the present invention may be recorded on a computer-readable information recording medium such as a compact disk, a flexible disk, a hard disk, a magneto-optical disk, a digital video disk, a magnetic tape, a semiconductor memory, etc.

The above program may be distributed or sold via a computer communication network independently from a computer on which the program is executed. The above information recording medium may be distributed or sold independently from a computer.

Effect of the Invention

The present invention can provide an introducing system and an introducing method for a server device to introduce users of terminal devices to each other while motivating the users to join the introducing system by presenting appropriate information to the users during the wait time before anyone is introduced to them, a computer-readable information recording medium storing a program for realizing these on a computer, and the program.

BRIEF DESCRIPTION OF DRAWINGS

FIG. 2 is an explanatory diagram showing a schematic configuration of an introducing system according to an embodiment of the present invention.

FIG. 3 is a session diagram showing how communications are performed in the introducing system according to an embodiment of the present invention.

EXPLANATION OF REFERENCE NUMERALS

Figure 1:
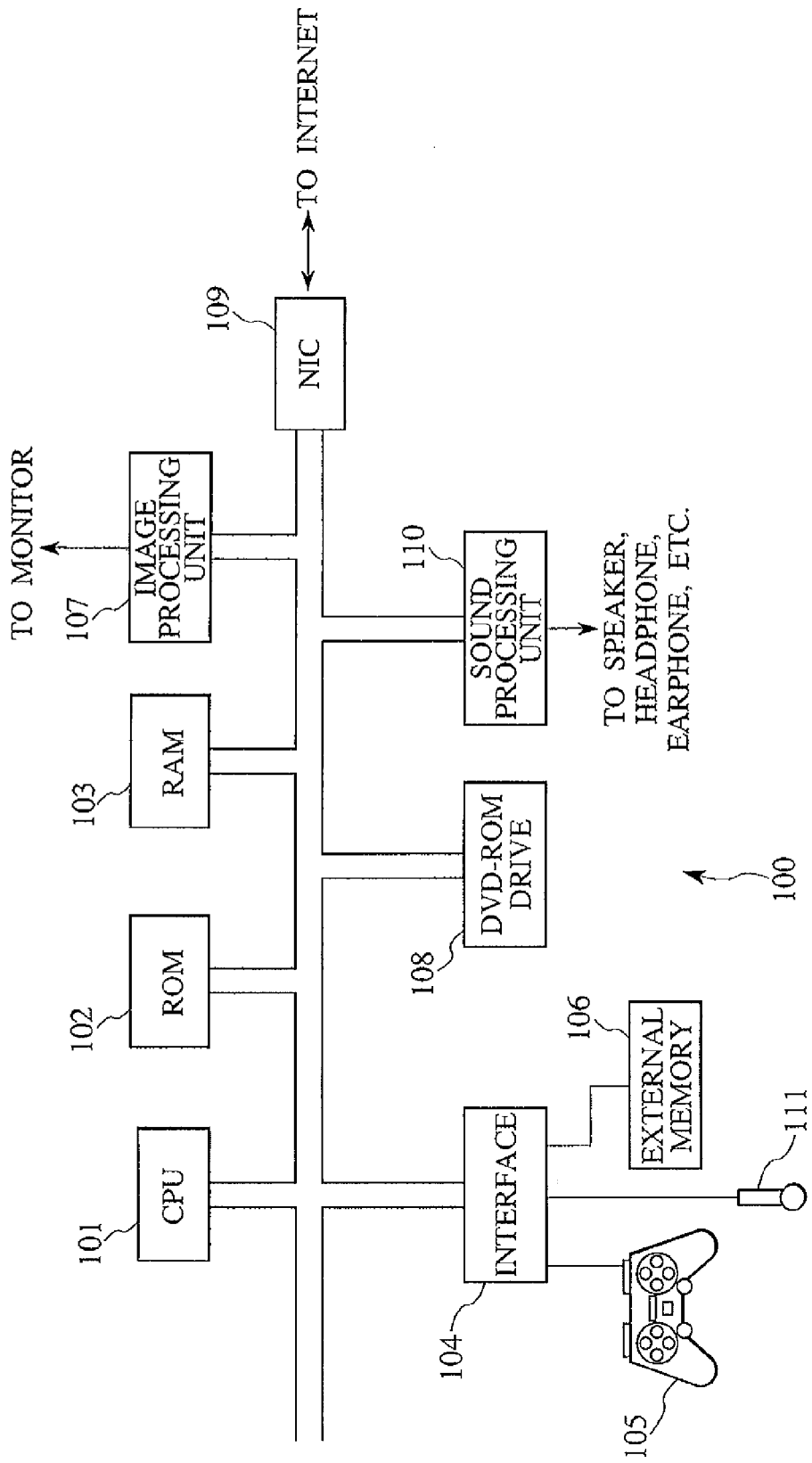
FIG. 1 is an exemplary diagram showing a schematic configuration of a typical information processing device that serves the functions of a terminal device, etc. according to the present invention by executing a program.

100 information processing device
101 CPU
102 ROM
103 RAM
104 interface
105 controller
106 external memory
107 image processing unit
108 DVD-ROM drive
109 NIC
110 sound processing unit
111 microphone
201 introducing system
221 server device
241 terminal device
251 Internet
301 temporal axis
302 band
303 time slot for a candidate time
304 time period between introduction times
305 margin time period
306 interval time period
401 introduction information storage unit
402 introduction time storage unit
403 introduction request receiving unit
404 introduction time deciding unit
405 introduction information adding unit
406 introduction response sending unit
407 user information acquiring unit
408 user report sending unit
409 extracting/deleting unit
410 grouping unit
411 introduction report sending unit
412 introduction time updating unit
413 user information storage unit
601 introduction request sending unit
602 introduction response receiving unit
603 user report receiving unit
604 display unit
605 introduction report receiving unit
606 communication unit

BEST MODE FOR CARRYING OUT THE INVENTION

Embodiments of the present invention will be described below. For ease of understanding, embodiments of the present invention that use an information processing device for games will be explained. However, the embodiments described below are provided to give explanations, not to limit the scope of the present invention. Therefore, those skilled in the art can adopt embodiments in which some or all of the elements herein have been replaced with respective equivalents, and such embodiments are also to be included within the scope of the present invention.

Embodiment 1

FIG. 1 is an exemplary diagram showing a schematic configuration of a typical information processing device that, by executing a program, functions as a terminal device, etc. according to the present invention. The following explanation will be given with reference to this diagram.

The information processing device 100 includes a Central Processing Unit (CPU) 101, a ROM 102, a Random Access Memory (RAM) 103, an interface 104, a controller 105, an external memory 106, an image processing unit 107, a Digital Versatile Disc ROM (DVD-ROM) drive 108, a Network Interface Card (NIC) 109, a sound processing unit 110, and a microphone 111.

When a DVD-ROM that stores a game program and data is inserted to the DVD-ROM drive 108 and the information processing device 100 is turned on, the program is executed and a terminal device, etc. according to the present embodiment is realized.

The CPU 101 controls the entire operation of the information processing device 100, and is connected to each component to exchange control signals and data with it. The CPU 101 can perform arithmetic operations such as addition, subtraction, multiplication, division, etc., logical operation such as logical addition, logical multiplication, logical negation, etc., and bit operations such as bitwise OR, bitwise AND, bit inversion, bit shift, bit rotation, etc., by working an Arithmetic Logic Unit (ALU) (unillustrated) on a register (unillustrated), which is a storage area that can be accessed at a high speed. Furthermore, the CPU 101 may by itself be configured to be able to perform saturate calculations such as addition, subtraction, multiplication, division, etc., vector operations such as trigonometric functions, etc. to deal with multimedia processing, or may realize these operations with a coprocessor.

An Initial Program Loader (IPL), which is executed immediately after the power is turned on, is stored in the ROM 102, and when executed, makes a program stored on a DVD-ROM be read into the RAM 103 and executed by the CPU 101. Further, an operating system program and various data that are necessary for controlling the operation of the whole information processing device 100 are stored in the ROM 102.

The RAM 103 is a temporary memory for data and programs, and retains programs and data read out from a DVD-ROM and data necessary for game proceeding and chat communications. The CPU 101 secures a variable area in the RAM 103, and performs such processes as performing operations by directly working the ALU on the value stored as the variable, or once storing the value stored in the RAM 103 in a register to perform calculations on the register and writing back the calculation result to the memory.

The controller 105 connected via the interface 104 receives an operation input given by a user for playing a game.

The external memory 106 detachably connected via the interface 104 rewritably stores data representing a play status of a game, etc. (past achievements, etc.), data representing a progress status of a game, log (record) data of chat communication in the case of network game battles, etc. As needed, a user can record such data onto the external memory 106 by giving an instruction input via the controller 105.

A DVD-ROM to be mounted on the DVD-ROM drive 108 stores a program for realizing a game and image data and sound data that accompany the game. Under the control of the CPU 101, the DVD-ROM drive 108 performs a reading process to the DVD-ROM mounted thereon to read out a necessary program and data, which are to be temporarily stored on the RAM 103, etc.

The image processing unit 107 processes data read out from a DVD-ROM by means of the CPU 101 and an image calculation processor (unillustrated) possessed by the image processing unit 107, and records the processed data in a frame memory (unillustrated) possessed by the image processing unit 107. Image information recorded on the frame memory is converted into video signals at predetermined synchronization timings and output to a monitor (unillustrated) connected to the image processing unit 107. This enables various types of image display.

The image calculation processor can perform, at a high speed, overlay calculation of two-dimensional images, transparency calculation such as α blending, etc., and various saturation calculations.

The image calculation processor can also perform, at a high speed, rendering of polygon information arranged in a virtual three-dimensional space and affixed with various texture information by Z buffering to obtain a rendered image of the polygon arranged in the virtual three-dimensional space as seen panoramically from a predetermined view position toward a predetermined direction of sightline.

Furthermore, the CPU 101 and the image calculation processor can work in cooperation to depict a string of letters as a two-dimensional image in the frame memory or on a surface of a polygon in accordance with font information that defines the shape of the letters.

The NIC 109 connects the information processing device 100 to a computer communication network (unillustrated) such as the Internet, etc. The NIC 109 is constituted by a 10BASE-T/100BASE-T product used for building a Local Area Network (LAN), an analog modem, an Integrated Services Digital Network (ISDN) modem, or an Asymmetric Digital Subscriber Line (ADSL) modem for connecting to the Internet via a telephone line, a cable modem for connecting to the Internet via a cable television line, or the like, and an interface (unillustrated) that intermediates between any of these and the CPU 101.

The information processing device 100 can connect via the NIC 109 to a SNTP server on the Internet and obtain current date and time information by acquiring information from the server. Alternatively, various types of network game server devices may be configured to serve the same function as a SNTP server.

Upon once obtaining date and time information, the information processing device 100 may update a counter that, while the information processing device 100 is in operation, functions similarly to a real time clock in response to a timer interrupt. Alternatively, in another embodiment in which the information processing device 100 includes a real time clock, the information processing device 100 may correct the date and time information indicated by the real time clock. At this time, the information processing device 100 may ask a user whether or not to correct the date and time information. In a case where the user is not to correct the built-in real time clock, the information processing device 100 may retain the difference between the information indicated by the real time clock and the information acquired from the server, and when date and time information is necessary, add the difference to the information obtained from the real time clock.

The sound processing unit 110 converts sound data read out from a DVD-ROM into an analog sound signal and outputs it from a speaker (unillustrated) connected thereto. Further, under the control of the CPU 101, the sound processing unit 110 generates a sound effect or music data that should be released in the progress of a game, and outputs sounds corresponding to the data from the speaker.

In a case where sound data recorded on a DVD-ROM is MIDI data, the sound processing unit 110 refers to sound source data held by the MIDI data to convert the MIDI data into PCM data. In a case where sound data recorded on a DVD-ROM is compressed in ADPCM form, Ogg Vorbis form, or the like, the sound processing unit 110 decompresses the data and converts it into PCM data. The sound processing unit 110 converts the PCM data from Digital to Analog (D/A) at timings corresponding to the sampling frequency of the data and outputs it to the speaker, thereby enabling sound output.

The microphone 111 may also be connected to the information processing device 100 via the interface 104. In this case, the information processing device 100 A/D converts an analog signal from the microphone 111 at an appropriate sampling frequency into a digital signal in PCM form so that the sound processing unit 110 can process the signal by mixing, etc.

Furthermore, the information processing device 100 may use a large capacity external storage device such a hard disk or the like and configure it to serve the same function as the ROM 102, the RAM 103, the external memory 106, a DVD-ROM mounted on the DVD-ROM drive 108, or the like.

The information processing device 100 explained above is a so-called "video game device for consumer use", but any device can realize the present invention as long as it is capable of communicating with other devices via a computer communication network. Accordingly, the present invention can be realized on various computers such as portable phones, portable game devices, karaoke machines, ordinary business-use computers, etc.

For example, an ordinary computer includes, likewise the information processing device 100 described above, a CPU a RAM, a ROM, a DVD-ROM drive, and an NIC, an image processing unit with simpler capabilities than those of the information processing device 100, and a hard disk as its external storage device with also compatibility with a flexible disk, a magneto-optical disk, a magnetic tape, etc. Such a computer uses a keyboard, a mouse, etc. instead of the controller 105 as its input device.

A server device is realized on an ordinary computer, but a predetermined one of a group of information processing devices 100 may be used as a server device. The information processing device 100 and an ordinary computer have a great difference from each other in their speed and capacity, but a small difference in their fundamental configuration and capabilities. Hence, in the following explanation, an ordinary computer and the information processing device 100 will be regarded as similar ones.

(Introducing System)

FIG. 2 is an explanatory diagram showing a schematic configuration of an introducing system according to the present embodiment. The following explanation will be given with reference to this diagram.

The present introducing system 201 includes a server device 221 and a plurality of terminal devices 241. The server device 221 and the terminal devices 241 can communicate with each other via Internet 251.

The terminal devices 241 perform peer-to-peer communication when performing an online battle or a chat. The terminal devices 241 use the server device 221 as a lobby server to let the server device introduce a peer for these communications.

That is, by using his/her own terminal device 241, a user asks the server device 221 for introduction of the terminal device 241 of another user, and after a predetermined period of time passes, can receive introduction and obtain the user name, communication identifiers such as an IP address, a port number, etc. of the peer.

After this, the terminal devices 241 introduced to each other perform peer-to-peer communication by referring to the IP address, the port number, etc. of the peer.

Other than this, in some embodiments, the terminal device 241 may not communicate directly with the terminal device 241 on the other side. For example, such embodiments assume that the server device 221 stores parameters of each user regarding a game. In time for users to receive introduction of their match, the server device 221 performs calculation processes about the battle of the game based on the stored parameters and sends an interim status or the result of the battle obtained by the calculations to the terminal devices 241 that are matched with each other. The terminal devices 241 then display the received calculations on the screen.

The following explanation will mainly assume a case in which the terminal devices 241 perform peer-to-peer communication with each other, but it is possible to apply the present invention to such embodiments as above.

In the present invention, during the period in which users wait for introduction, the server device 221 timely transmits to each terminal device 241, information such as some kinds of numbers each representing the number of users who are currently waiting for introduction (who are in the introduction waiting list), the time left before the users will actually receive an introduction, information regarding a user who uses the terminal device 241 that has newly queried the server device 221 for introduction. The terminal devices 241 display the information on the screen.

FIG. 3 is a session diagram showing how communications are performed in the introducing system according to the simplest setting of the present embodiment. The following explanation will be given with reference to this diagram.

In FIG. 3, the temporal axis 301 is scaled with times . . . , $t_{i-1}, t_i, \ldots$, which are introduction times at which the sever device 221 performs a matching (grouping) process for introduction.

FIG. 3 shows a band 302 that indicates the transition from the introduction time assigned for given terminal devices 241 that request introduction to the introduction time assigned for other such terminal device 241. An introduction time that is set on the band 302 at a given point of time will be referred to as "candidate time".

As shown in FIG. 3, a time slot 303, to which the time $t_i$ is set as the candidate time, is shifted from a time period 304 between the time $t_{i-1}$ and the time $t_i$ by a margin time period 305.

Although not shown, a time slot, to which the time $t_{i+1}$ is set as the candidate time, is shifted from a time period between the time $t_i$ and the time $t_{i+1}$ by the margin time period 305.

The margin time period 305 is shorter than an interval time period 306, which represents an interval between the time $t_{i-1}$ and the time $t_i$, and an interval between the time $t_i$ and the time $t_{i+1}$.

The same relationship as above is established also when the subscripts take preceding or succeeding values of the above values.

To shift the time slots is one of the features of the configuration of the present invention.

As shown in FIG. 3, when an introduction request (indicated by a solid-line arrow) is sent by the terminal devices 241 and reaches the server device 221, the server device 221 returns an introduction response (indicated by a dashed-line arrow) that designates the candidate time that is currently indicated on the band 302 to the terminal devices 241 and also sends a user report (indicated by a bold-line arrow) to the terminal devices 241 that are in the introduction waiting list. The user report indicates the current status of the users in the introduction waiting list, for example, the total number of users who are currently in the introduction waiting list, the number of users in the introduction waiting list, to whom the same introduction time as assigned to each terminal device 241 to which the report is sent is assigned, etc.

When each of the times . . . , $t_{i-1}$, $t_i$, $t_{i+1}$, . . . comes, the server device 221 performs matching (grouping) of the terminal devices 241 that are assigned that introduction time, and sends matching terminal devices 241 an introduction report (indicated by a white arrow) that introduces each other's matching device.

The terminal device 241 that has received an introduction report will be able to perform peer-to-peer communication including a battle, a chat, etc. with its matching device that is designated in the introduction report.

Assumed in the example shown in FIG. 3 as the terminal devices 241 are terminal devices 241a to 241f.

The terminal devices 241a and 241b send an introduction request to the server device 221 before the time $t_{i-1}$, but at that time they send the request, the time $t_i$ has already been set as the candidate time. Therefore, the introduction response to the terminal devices 241a and 241b designates the introduction time $t_1$.

Subsequently, when the current time becomes the time the server device 221 sends an introduction report to any terminal device 241 (unillustrated) that has requested introduction before the terminal device 241a.

Hence, at a time that is immediately after the time at which the server device 221 has performed introduction matching, the total number of users who remain in the introduction waiting list is not zero but two, namely the users of the terminal devices 241a and 241b that are assigned the time $t_i$ as their introduction time.

Subsequently, from the time $t_{i+1}$ and before the time $t_i$, the terminal devices 241c, 241d, and 241e send an introduction request to the server device 221 and receive an introduction response that designates the introduction time $t_i$.

The terminal device 241f sends an introduction request to the server device 221 during a time period from the time $t_{i-1}$ before the time $t_i$, but at that time the terminal device 241f sends the request, the time $t_{i+1}$ has already been set as the candidate time. Therefore, the introduction response to the terminal device 241f designates the introduction time $t_{i+1}$.

Thereafter, when the current time becomes the time $t_i$, the server device 221 performs introduction matching of the terminals 241a to 241e to which the time $t_i$ is assigned as their introduction time t, and sends an introduction report to them.

At a time that is immediately after the time $t_i$ at which the server device 221 has performed matching, the total number of users who remain in the introduction waiting list is not zero but one, namely the user of the terminal device 241f to which the time $t_{i+1}$ is assigned as its introduction time.

The time slot 303 for a given candidate time is shifted from the time period 304 between a given introduction time and its succeeding introduction time. Where the expected value of the number of terminal devices 241 that may request introduction per a unit time period is "v", the margin time period 305 is A, and the interval time period 306 is B, the values A and B satisfy the relationship of A<B, the expected value of the number of users who may be processed in a given session of introduction matching is vB, and the expected value of the number of users to be pooled is vA.

In a case where such shifting is not provided, the value A is equal to zero (A=0) and the expected value of the number of users to be pooled is hence zero. However, in accordance with the present invention, the value A is larger than zero (A>0). Therefore, the expected value of the number of users to be pooled is larger than zero. Hence, it is possible to prevent as much as possible a situation that the number of users in the introduction waiting list is cleared to zero but to pool some minimum number of users.

In a case where the introducing system notifies a user who requests introduction of how many other users are likewise waiting for introduction, the user might immediately give up receiving introduction and stop using the introducing system if notified that the number of other users is "zero". If such a phenomenon occurs repeatedly, the number of users who request introduction will remain zero forever.

In accordance with the present invention, with the margin time period 305, it can be expected that the number of other users is almost always larger than "zero". Therefore, it is possible to prevent as much as possible the above situation that the number of users who are in the introduction waiting list is zero.

Specific configurations of the server device 221 and the terminal device 241 will be explained in more detail below.

(Server Device)

Figure 4:
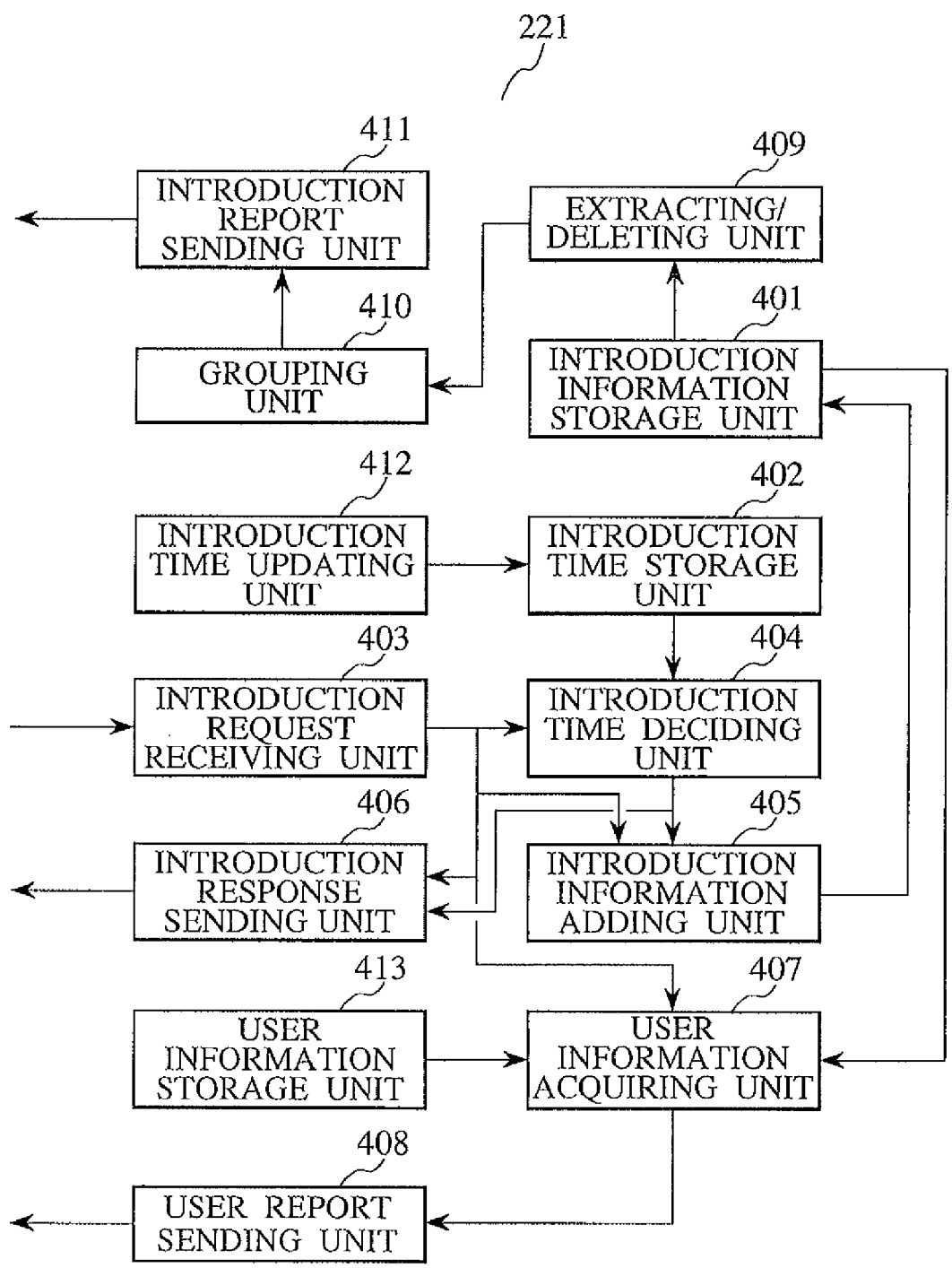
FIG. 4 is an explanatory diagram showing a schematic configuration of a server device in a communication system according to an embodiment of the present invention.
Figure 5:
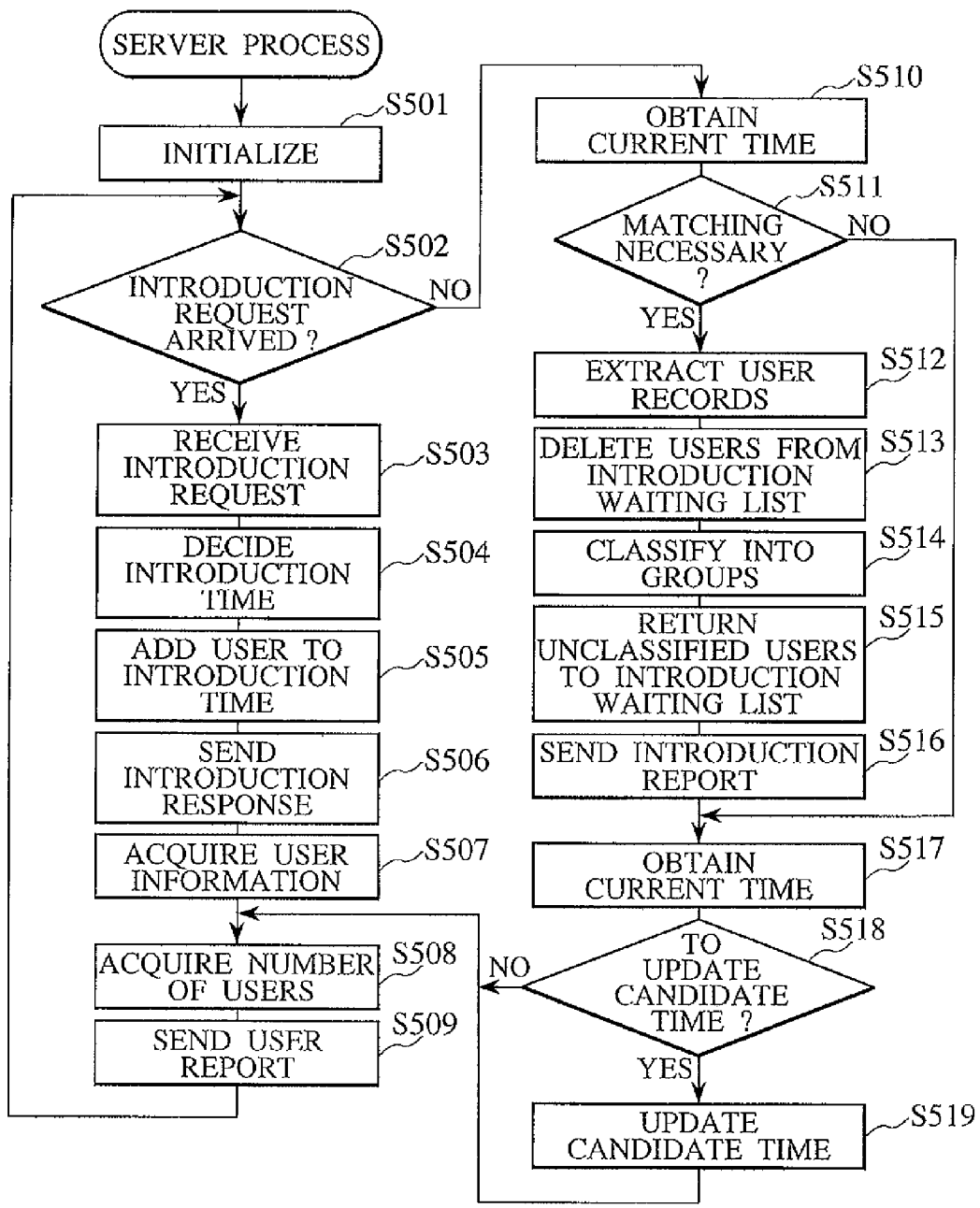
FIG. 5 is a flowchart showing a control flow of a server process performed by the server device.

FIG. 4 is an explanatory diagram showing a schematic configuration of the server device in a communication system according to the present embodiment. FIG. 5 is a flowchart showing the control flow of a server process performed by the server device. The following explanation will be given with reference to these diagrams.

The server device 221 according to the present embodiment is realized by the information processing device 100 executing a predetermined server program.

The server device 221 includes an introduction information storage unit 401, an introduction time storage unit 402, an introduction request receiving unit 403, an introduction time deciding unit 404, an introduction information adding unit 405, an introduction response sending unit 406, a user information acquiring unit 407, a user report sending unit 408, an extracting/deleting unit 409, a grouping unit 410, an introduction report sending unit 411, an introduction time updating unit 412, and a user information storage unit 413.

When the server device 221 starts the server process, the CPU 101 of the information processing device 100 on which the server device 221 is realized initializes the introduction information storage unit 401 and the introduction time storage unit 402 that are secured in the RAM 103 (step S501).

The introduction information storage unit 401 stores the following pieces of information in association with one another as one record.

(a) a user name of a user who requests introduction of another user (b) an introduction time at which an introduction should be presented to the user (c) communication identifiers (an IP address, a port number, etc.) of the terminal device 241 used by the user The user name is typically an identification number or an IDentifier (ID) assigned to each user uniquely.

The introduction time is the time at which an introduction is planned to be presented to the user who requests introduction of another user. Unless there occurs an error such as there existing no user that can be introduced, the introduction time is a time that is behind the current time.

Since any correspondence to the user is necessarily sent via the user terminal 241, the communication identifiers of the terminal device 241 used by the user are also stored.

Typically, the introduction information storage unit 401 is configured as an array of structures each including the above components, but may be realized with the use of various types of database systems. In this case, the introduction information storage unit 401 is realized by the RAM 103 and a hard disk that work in cooperation.

In the initialization, the introduction information storage unit 401 is cleared and the number of user names stored becomes zero.

The introduction time storage unit 402 stores a candidate time as the candidate for the introduction time.

The candidate time is used as an introduction time to be assigned to any user that will request introduction next. Therefore, the candidate time is a time that is behind the current time.

Typically, the candidate time stored in the introduction time storage unit 402 is incremental at predetermined unit temporal intervals (i.e., the candidate time is updated to future times).

In the following explanation, the variable that represents the candidate time stored in the introduction time storage unit 402 will be expressed as "s". In the present embodiment, the initialization is done by performing s←the current time+B to set the variable "s" to indicate a time that is behind the current time by the interval time period B. Here, the symbol "←" means to substitute a value.

When the initialization is completed, the CPU 101 of the server device 221 checks the receiving status of the NIC 109 to determine whether an introduction request has arrived from any terminal device 241 (step S502). In a case where none has arrived (step S502; No), the CPU 101 goes to step S510.

On the other hand, in a case where there has arrived any (step S502; Yes), the CPU 101 receives the arrived introduction request via the NIC 109 (step S503). Hence, the NIC 109 functions as the introduction request receiving unit 403.

Since introduction requests are sent in accordance with instructions of the users of the terminal devices 241, these introduction requests usually arrive at the server device 221 at dispersed times.

The received introduction request includes the following pieces of information.

(a) the communication identifiers (an IP address and a port number) of the terminal device 241 that has sent the request (b) the user name of the user using the terminal device 241

Upon reception of the introduction request, the CPU 101 decides the candidate time "s" stored in the introduction time storage unit 402 as the introduction time at which an introduction should be presented to the user having the user name designated in the received introduction request (step S504). Accordingly, the CPU 101 works in cooperation with the RAM 103 to function as the introduction time deciding unit 404.

Then, the CPU 101 stores the following pieces of information in association with one another in the introduction information storage unit 401 as one record of an additional introduction waiting user (step S505).

(a) the user name designated in the received introduction request (b) the introduction time decided at step S504

(c) the communication identifiers (an IP address and a port number) of the terminal device 241 that has sent the introduction request As a result, the number of user names stored in the introduction information storage unit 401 increases by one.

Hence, the CPU 101 works in cooperation with the RAM 103 to function as the introduction information adding unit 405.

Then, the CPU 101 sends, via the NIC 109, an introduction response that designates the introduction time decided at step S504 to the terminal device 241 that has sent the introduction request (step S506).

Through this process, each terminal device 241 can be notified of the time at which the user using the terminal device 241 can receive an introduction.

Hence, the CPU 101 works in cooperation with the NIC 109 to function as the introduction response sending unit 406.

At steps S503 to S506, an introduction request and an introduction response have been exchanged. In the process thereafter, the server device 221 performs a process of sending various information to the terminal devices 241 of the users who have already been in the introduction waiting list.

Here, the user information storage unit 413 has previously stored a user name and user information about the user having that user name in association. "User information" includes, for example, a handle name or a nickname of the user, his/her avatar image, etc. Additionally, in the case of an online battle game, user information may include the win-loss record or the level of the user, his/her favorite technique, his/her equipment, etc. In the case of a friend matching game, user information may include the user's hobby, the type of the other sex whom the user likes, the user's favorite food, etc.

The user information storage unit 413 is typically configured by a database. Hence, a hard disk will function as the user information storage unit 413.

The CPU 101 acquires user information stored in the user information storage unit 413 in association with the user name designated in the received introduction request (step S507).

The CPU 101 further acquires the number of user names (or the number of users) that are stored in the introduction information storage unit 401 (step S508). The CPU 101 acquires this number because the introduction information storage unit 401 has been updated by the procedure of step S505.

Through this process, the CPU 101 works in cooperation with the RAM 103, a hard disk, etc. to function as the user information acquiring unit 407.

Then, the CPU 101 sends, via the NIC 109, a user report that designates the acquired user information that designates the following pieces of information to each terminal device 241 whose communication identifiers are stored in the introduction information storage unit 401 (step S509), and returns to step S502.

(a) the user information, acquired at step S507, about the user who has newly requested introduction (b) the number of users currently in the introduction waiting list acquired at step S508

Hence, the CPU 101 works in cooperation with the NIC 109 to function as the user report sending unit 408.

At step S508, the CPU 101 may acquire not only the total number of users in the introduction waiting list but information indicating the number of users counted for each introduction time, which may also be designated in the user report.

The CPU 101 needs not send all the numbers of users counted for the respective introduction times, but may designate in the user report only the number of users counted for the introduction time that is stored in association with the communication identifiers of the terminal device 241 to which the user report is addressed.

Other than this, as will be described later, in a case where step S509 is reached through a control flow that reaches step S508 by skipping step S507, the user report will not include user information about a user who has newly requested introduction, but include only the number of users.

These pieces of information are displayed as needed on the terminal device 241 to intrigue the user and motivate the user to join the introducing system 201.

On the other hand, in a case where no introduction request has arrived at step S502 (step S502; No), the CPU 101 of the server device 221 refers to the real time clock or the like to obtain the current time (step S510).

The CPU 101 checks whether or not the introduction information storage unit 401 includes any records in which the described introduction time is equal to or ahead of the current time, i.e., whether or not there exist any users for whom introduction matching has to be performed immediately (step S511). In a case where there exist such users (step S511; Yes), the CPU 101 extracts all such records (step S512), deletes the extracted records from the introduction information storage unit 401 to exclude the extracted users from the introduction waiting list (step S513).

Hence, the CPU 101 works in cooperation with the RAM 103, etc. to function as the extracting/deleting unit 409.

The users extracted here are those whom an introduction has to be presented to right away. Unless there occurs an error such as an impossibility of introduction, the users whose introduction time is equal to or behind the current time should have the same introduction time as each other.

The CPU 101 classifies the extracted records into a plurality of groups (step S514). Hence, the CPU 101 functions as the grouping unit 410.

The number of records classified into each group varies depending on the purpose for which the introducing system is used. In online battle games, online go games, online shogi games, online chess games, etc., each match is typically fought between one player on one side and one player on the other side. In dating games and e-pal finding games, it is typical that a person and another person are introduced to each other. Therefore, in these cases, the number of users included in each group is two. In online mah-jong games, etc., four players confront one another. Therefore, the number of users included in each group is four. As obvious from this, it is possible to change the number of user names included in each group appropriately depending on the purpose. The users having the user names included in each group are the matched users, who are to be introduced to each other.

This grouping may be performed at random. Alternatively, based on the information stored in the user information storage unit 413, it is possible to employ a method that matches users who are in similar levels or users who have the same hobby or who are the other's type each other and classify them into one group.

In a case where there is/are any record(s) that has/have left unclassified, such as a record of a user who is by him/herself included in a group in the case of introduction of a user to another, or records of three or less users who are included in a group in the case of introduction of four users to one another, the CPU 101 corrects the introduction time of each such record to the current candidate time "s" and stores the record in the introduction information storage unit 401 as an additional record to return the user to the introduction waiting list (step S515).

Such a situation can occur when the number of extracted records is odd in the case of introduction of a user to another or when the number of extracted records is not a multiple of four in the case of introduction of four users to one another. In order to prevent such a situation, a process to be described later, performed by the introduction time updating unit 412, may employ some skill Then, regarding each classified group, the CPU 101 sends to the terminal device 241 of each of the users whose user name is included in that group, an introduction report that designates the user name(s) of another or the other user(s) included in the group (step S516). Hence, the CPU 101 works in cooperation with the NIC 109 to function as the introduction report sending unit 411.

In this way, each terminal device 241 receives introduction of another or the other user(s). Here, the introduction report typically designates not only a user name, but also the communication identifiers (an IP address, a port number, etc.) of the terminal device 241 of the user.

Aside from this, the CPU 101 may perform battle simulation to let the users fight with each other in each classified group and calculate wins and losses or a rank in the group.

If the introduction report to be sent to the terminal devices 241 having the communication identifiers designated in the records included in each group designates the win-loss result or the rank of the users and information indicating the temporal change of the battle simulation, these pieces of information are notified to the terminal devices 241 and can be displayed on the terminal devices 241.

It is possible to employ various ranking methods depending on the rules of the games, such as comparing parameters stored in the user information storage unit 413 in association with the user names, such as attributes, a level, past achievements, owned items, etc. with an appropriate weight applied, deciding a win or a loss by using a random number, etc.

When such an introducing process is completed, the CPU 101 obtains the current time from the real time clock or the like (step S517), and determines whether or not to update the candidate time stored in the introduction time storage unit 402 (step S518). At this time, it is necessary to consider the following conditions.

First, in a case where the current time is equal to or behind "a time s-A that is ahead of the candidate time "s" by the margin time period A", it is desirable to update the candidate time "s" as soon as possible.

In a case where the number of records in the introduction information storage unit 401 with which the candidate time "s" is associated as the introduction time does not satisfy the condition of a number that can minimize the number of users who might be left unclassified, it is possible to regard that updating is inappropriate. For example, the number of records should be odd in the case of introduction of a user to another or should be a multiple of four in the case of introduction of four users to one another. When such a condition is not satisfied, it might be better not to update the candidate time "s".

Alternatively, in a case where the number of records in the introduction information storage unit 401 with which the candidate time "s" is associated as the introduction time exceeds a predetermined first threshold, which means that a sufficient number of users for performing grouping have been pooled, it is possible to regard that the candidate time "s" may be updated right away. In this case, it is desired that the threshold be set to meet the condition about the number of records (the condition in the above example that the number should be odd or a multiple of four, or like conditions).

The CPU 101 determines whether or not to update the candidate time "s" by combining these conditions appropriately depending on the purpose for which the introducing system is used.

In a case where it is determined to update the candidate time "s" (step S518; Yes), the CPU 101 performs s ← the current time+B
(step S519), and returns to step S508. The CPU 101 returns to step S508 also in a case where it is determined not to update the candidate time "s" (step S518; No).

Hence, the CPU 101 works in cooperation with the RAM 103 to function as the introduction time updating unit 412.

Here, the CPU 101 returns to step S508 because the number of users in the introduction waiting list has changed. Therefore, the terminal devices 241 used by the users who are currently in the introduction waiting list need to be notified of the latest information.

It is possible to employ an embodiment in which the time decided by the introduction time deciding unit 404 at step S504 is not simply the candidate time "s".

That is, the introduction time deciding unit 404 checks the records stored in the introduction information storage unit 401 and acquires those records with which associated is a time (referred to as "closest time") that is ahead of the candidate time "s" and the closest to the candidate time "s".

Then, in a case where the following conditions are satisfied, the introduction time deciding unit 404 decides the closest time as the introduction time.

(a) the number of records with which the closest time is associated as the introduction time exceeds a predetermined first threshold.

(b) the number of records with which the candidate time "s" is associated as the introduction time exceeds a predetermined second threshold.

Here, the first threshold represents a number of users that is sufficient for performing introduction grouping, and the second threshold represents a smallest number of users that is expected not to demotivate the users when displayed on the screen. In this embodiment of the invention, two introduction times are assumed. When the earliest introduction time of the two has not yet come and in a case where there are a certain number of or more users to whom the latest introduction time of the two is assigned, not the candidate time but the introduction time (closest time) that is ahead of and the closest to the candidate time is used as the introduction time.

The closest time is a time ahead of the candidate time, and there are pooled a certain number of or more users to whom the closest time is assigned as the introduction time. Hence, by deciding not the candidate time but its closest time as the introduction time, it is possible for the users to receive an introduction in a proportionately shorter wait time.

When the current time becomes the closest time, all the records with which the closest time is associated as the introduction time will be extracted and deleted. Therefore, afterwards, the candidate time will be decided as the introduction time.

The configuration of the terminal device 241 will now be explained in detail.

(Terminal Device)

Figure 6:
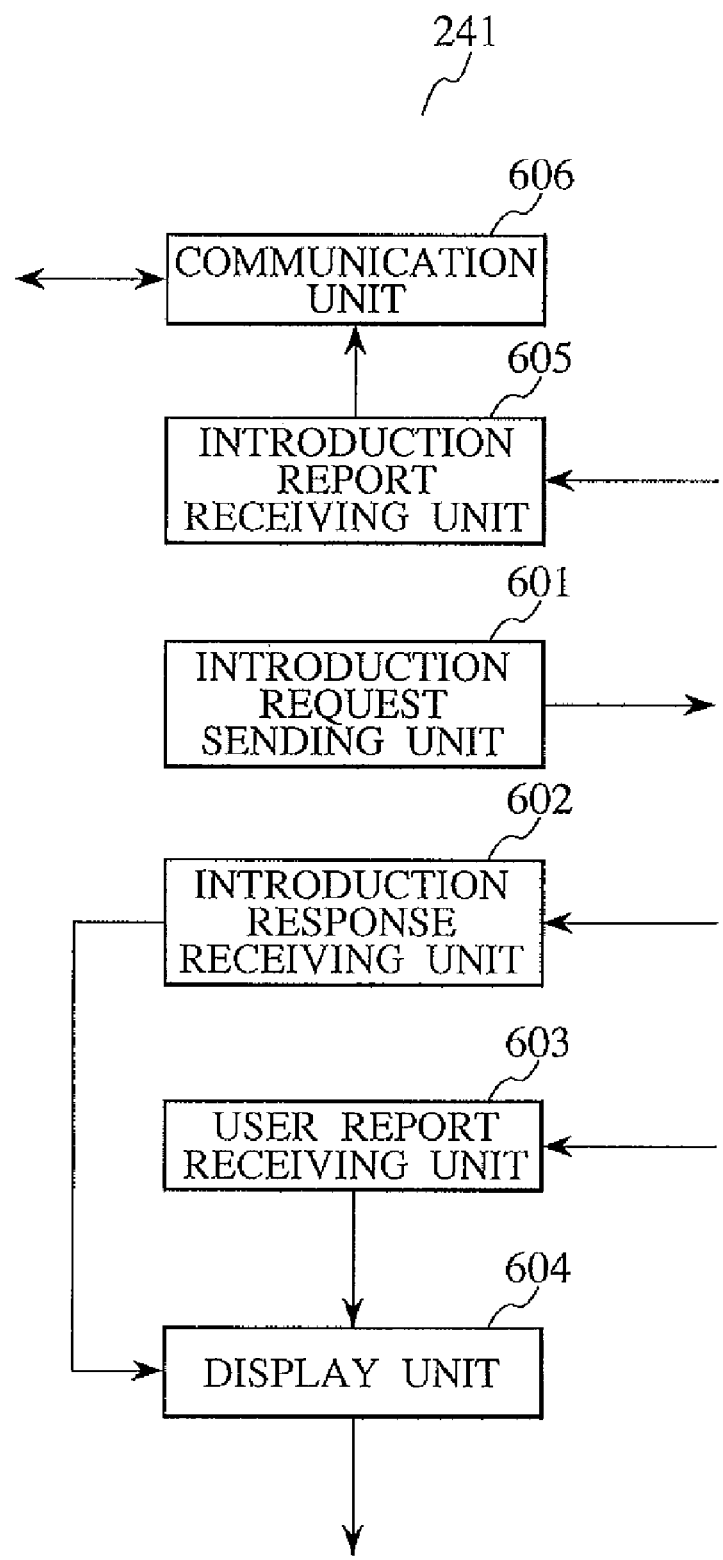
FIG. 6 is an explanatory diagram showing a schematic configuration of a terminal device in a communication system according to an embodiment of the present invention.
Figure 7:
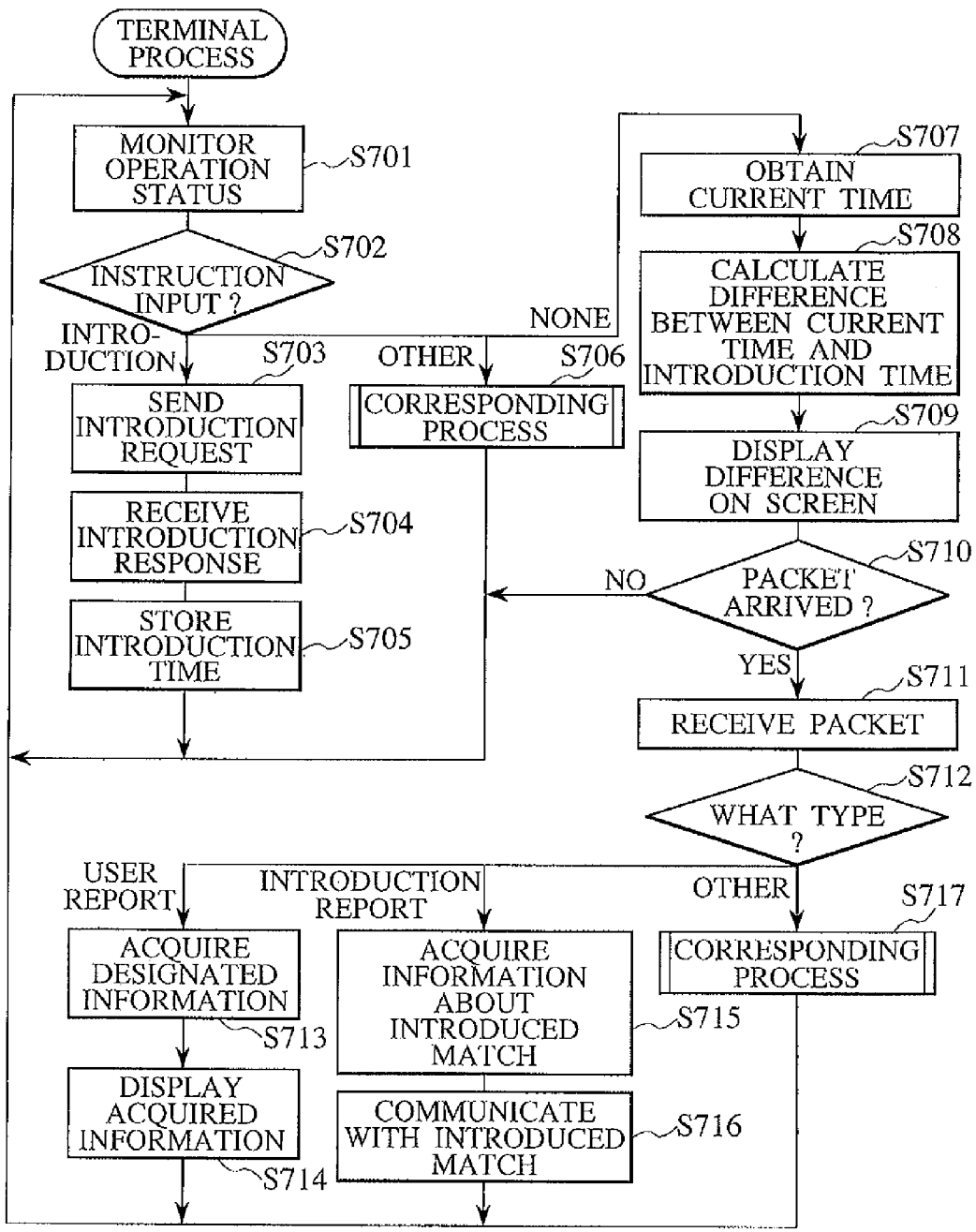
FIG. 7 is a flowchart showing a control flow of a terminal process performed by the terminal device.

FIG. 6 is an explanatory diagram showing a schematic configuration of the terminal device in the communication system according to the present embodiment. FIG. 7 is a flowchart showing the control flow of a terminal process performed by the terminal device. The following explanation will be given with reference to these diagrams.

The terminal device 241 according to the present embodiment is realized by the information processing device 100 executing a predetermined terminal program.

The terminal device 241 includes an introduction request sending unit 601, an introduction response receiving unit 602, a user report receiving unit 603, a display unit 604, and an introduction report receiving unit 605. In addition, the terminal device 241 may include a communication unit 606 as shown in FIG. 6.

When the terminal device 241 starts the terminal process, the CPU 101 of the information processing device 100 monitors the operation status of the input device such as a keyboard, a mouse, etc. (step S701). When the user enters an instruction for requesting introduction of another user (step S702; introduction), the CPU 101 sends an introduction request that designates the user name of the user to the server device 221 via the NIC 109 (step S703).

Hence, the CPU 101 works in cooperation with the NIC 109, etc. to function as the introduction request sending unit 601.

When the user wants another user to be introduced, he/she enters the wish to the terminal device 241 by appropriately operating his/her terminal device 241. In a case where the terminal device 241 is a portable phone or a game device, the user typically enters such an input by various types of button or key operations. In a case where the terminal device 241 is an ordinary computer, the user typically enters such an input by various types of mouse operations.

Then, the CPU 101 receives an introduction response sent by the server device 221 via the NIC 109 (step S704). Hence, the CPU 101 works in cooperation with the NIC 109 to function as the introduction response receiving unit 602.

The CPU 101 acquires the introduction time designated in the introduction response, stores it in a predetermined area of the RAM 103 (step S705), and returns to step S701.

In a case where the user gives any other type of operation (step S702; other), the CPU 101 performs a corresponding process (step S705) and returns to step S701.

In a case where the user gives no particular instruction input (step S702; none), the CPU 101 refers to the real time clock or the like to obtain the current time (step S707), calculates the difference between the introduction time stored in the RAM 103 and the obtained current time (step S708), and displays the calculation result on the screen (step S709).

The difference is a remaining wait time indicating for how long the user of the terminal device 241 has to wait before receiving an introduction.

Hence, under the control of the CPU 101, the image processing unit 107 and the monitor connected thereto function as the display unit 604.

The CPU 101 checks whether or not any communication packet that is sent by the server device 221 has arrived at the NIC 109 (step S710). In a case where none has arrived (step S710; No), the CPU 101 returns to step S701. In a case where any has arrived (step S710; Yes), the CPU 101 receives the communication packet (step S711) and checks the type of the packet (step S712).

In a case where the communication packet is a user report (step S712; user report), the CPU 101 acquires the information designated in the user report (step S713). Hence, the CPU 101 works in cooperation with the NIC 109 to function as the user report receiving unit 603.

The information designated in the user report includes the followings.

(a) information about a user who has newly requested introduction; may not be included depending on the timing at which the user report has been sent.

(b) the total number of users currently in the introduction waiting list (c) the number of users in the introduction waiting list, who are to receive an introduction at the same introduction time as the terminal device 241 in question These pieces of information may be appropriately combined or appropriately omitted based on the purposes of use.

Then, the CPU 101 issues an instruction to the image processing unit 107 to display the information acquired from the user report on the screen (step S714), and returns to step S701.

Thus, the user of the terminal device 241 can confirm the wait time before he/she receives an introduction on the display screen, and be kept motivated to join the introducing system.

Further, the user of the terminal device 241 can confirm the number of the other users in the introduction waiting list during the wait time before he/she receives an introduction. Therefore, the user can feel a bond to the other users and expect that out of many users, a user who matches him/herself would be introduced to him/her.

In a case where the communication packet is an introduction report (step S712; introduction report), the CPU 101 acquires the information about the introduced match, such as his/her user name, the communication identifiers of his/her terminal devices 241, etc. that are designated in the introduction report (step S715), and starts communicating with the introduced match via the NIC 109 (step S716). Hence, the CPU 101 works in cooperation with the NIC 109 to function as the introduction report receiving unit 605 and the communication unit 606.

When the communication with the introduced match is completed, the CPU returns to step S701.

In a case where the communication packet is of any other type, (step S712; other), the CPU 101 performs a corresponding process (step S717) and returns to step S701.

With this flow, the remaining wait time and the information designated in the user report are displayed on the screen all the time while the user is in the introduction waiting list, i.e., from the time the introduction response is received until the introduction time. However, the information designated in the user report may be displayed in a limited time period.

The condition on which the information designated in the user report is displayed on the screen will be referred to as user report display condition. The user report display condition may be satisfied in the manners described below.

(a) the user report display condition is satisfied during a period after an introduction response is received until the current time becomes the introduction time.

(b) the user report display condition is satisfied during a period after an introduction response is received until the current time becomes the introduction time, provided that the difference between the introduction time and the current time is equal to or smaller than the difference between the interval time period B and the margin time period A.

(c) the user report display condition is satisfied during a period after an introduction response is received until the current time becomes the introduction time, provided that the number of users in the introduction waiting list, who are to receive an introduction at the same time as designated in the user report exceeds a predetermined threshold.

The manner (a) is the simplest one, based on which the total number of users in the introduction waiting list that is designated in the user report or the number of users in the introduction waiting list who are to receive an introduction at the same time that is designated in the user report is simply displayed.

The manner (b) is for preventing as much as possible the total number of users in the introduction waiting list that is to be displayed on the screen or the number of users in the introduction waiting list who are to receive an introduction at the same time that is to be displayed on the screen from decreasing or taking a small value, by not displaying the number of users until some users are pooled in the introduction waiting list during the margin time period B.

The manner (c) is for preventing the number of users in the introduction waiting list who are to receive an introduction at the same time that is to be displayed on the screen from taking a small value, by not displaying the number of users until some users are pooled in the introduction waiting list.

Typically, an introduction report designates not only the user name of a user of a terminal device 241 but also the communication identifiers of that user terminal 241. Based on these communication identifiers, peer-to-peer communication that is not relayed by the server device 221 is performed and communications such as an online battle or a chat are performed.

As described above, since it is typical that the communication identifiers of a terminal device 241 and a user name are processed collectively, it is possible to regard the communication identifiers of a terminal device 241 as a user name.

An embodiment that does not include the communication unit 606 may be realized by a method of designating the result or an interim status of a battle between a user and his/her introduced match in the introduction report and displaying the result or the interim status on the screen, a method of displaying the user name of the introduced match on the screen, a method of registering an e-mail address of the introduced match in an address book as his/her user name, etc.

The present application claims priority to Japanese Patent Application No. 2007-112286 filed on Apr. 20, 2007, the content of which is to be incorporated herein if incorporation is permitted in by statute in the designated state.

INDUSTRIAL APPLICABILITY

As explained above, the present invention can provide an introducing system and an introducing method for a server device to introduce users of terminal devices to each other while motivating the users to join the introducing system by presenting appropriate information to the users during the wait time before anyone is introduced to them, a computer-readable information recording medium storing a program for realizing these on a computer, and the program.

What is claimed is:

1. An introducing system, comprising a server device and a plurality of terminal devices, the server device and the terminal devices being capable of communicating with each other via a computer communication network, wherein (a) the server device includes:

an introduction information storage unit that stores a user name of a user who requests introduction of another user and an introduction time at which an introduction should be presented to the user in association with each other; and an introduction time storage unit that stores a candidate time that is a candidate for the introduction time, wherein (b) each of the plurality of terminal devices includes an introduction request sending unit that sends an introduction request that designates a user name of a user of the terminal device to the server device in accordance with an instruction of the user, wherein (c) the server device further includes:

an introduction request receiving unit that receives the introduction request sent by each of the plurality of terminal devices;

an introduction time deciding unit that, when the introduction request is received, decides the introduction time at which an introduction should be presented to the user having the user name designated in the introduction request, to be the candidate time stored in the introduction time storage unit;
an introduction information adding unit that, when the introduction time is decided, additionally stores the user name and the introduction time in association with each other in the introduction information storage unit;
an introduction response sending unit that sends an introduction response that designates the decided introduction time to the terminal device that has sent that introduction request;
a user information acquiring unit that acquires a number of user names stored in the introduction information storage unit when the introduction information storage unit is updated; and
a user report sending unit that sends a user report that designates the acquired number of user names to each terminal device, among the plurality of terminal devices, that is used by any user having the user name stored in the introduction information storage unit,
wherein (d) each of the plurality of terminal devices further includes:
an introduction response receiving unit that receives the introduction response sent by the server device;
a user report receiving unit that receives the user report sent by the server device; and
a display unit that displays a difference between the introduction time designated in the received introduction response and a current time until the current time becomes the introduction time, and when the user report is received and in a case where a predetermined user report display condition is satisfied, displays the number of user names designated in the user report,
wherein (e) the server device further includes:
an extracting/deleting unit that extracts from the introduction information storage unit any user names whose associated introduction time is equal to or behind the current time among the user names stored in the introduction information storage unit, and deletes the extracted user names from the introduction information storage unit;
a grouping unit that classifies the extracted user names into one or a plurality of group(s); and
an introduction report sending unit that sends to each terminal device that is used by any user having the user name that belongs to the classified one group or any of the plurality of classified groups, an introduction report that designates the user name(s) of another or the other user(s) belonging to that group,
wherein (f) each of the plurality of terminal devices further includes an introduction report receiving unit that receives the introduction report sent by the server device,
wherein (g) the server device further includes an introduction time updating unit that, when the current time becomes a time that is ahead of the candidate time stored in the introduction time storage unit by a predetermined margin time period, updates the candidate time to a time that is behind by a predetermined interval time period that is longer than the margin time period, and
wherein (h) in each of the plurality of terminal devices, the predetermined user report display condition is satisfied in a case where the current time is after when the introduction response is received, and besides, the current time is before the introduction time designated in the received introduction response.

2. The introducing system according to claim 1,
wherein (i) the server device further includes a user information storage unit that stores a user name and user information regarding a user having the user name in association with each other,
the user information acquiring unit further acquires the user information that is stored in the user information storage unit in association with the user name designated in the received introduction request, and
the user report sending unit sends the user report by further designating therein the acquired user information, and
wherein (j) in each of the plurality of terminal devices, when the user report is received, the display unit further displays the user information designated in the user report.

3. The introducing system according to claim 2,
wherein in the server device,
the grouping unit acquires the user information that is stored in the user information storage unit in association with each user name that belongs to the classified one group or any of the plurality of classified groups, and determines a rank of the user names belonging to that group based on the acquired user information, and
the introduction report sending unit sends the introduction report by further designating therein all the user names included in each group and the rank of the user names, and
wherein in each of the plurality of terminal devices, the display unit further displays all the user names and the rank of the user names that are designated in the introduction report sent by the server device.

4. The introducing system according to claim 1,
wherein each of the plurality of terminal devices further includes a communication unit that communicates with the terminal device, among the plurality of terminal devices, that is used by the user having the user name designated in the received introduction report.

5. The introducing system according to claim 1,
wherein in the server device,
the user information acquiring unit acquires the number of user names stored in the introduction information storage unit that is counted for each introduction time stored in the introduction information storage unit, and
the user report sending unit sends to each terminal device, among the plurality of terminal devices, that is used by any user having the user name stored in the introduction information storage unit, a user report that designates the acquired number of user names that is counted for the introduction time associated with the user name of that user.

6. The introducing system according to claim 1,
wherein in each of the plurality of terminal devices, the predetermined user report display condition is satisfied in a case where the current time is after when the introduction response is received, besides the current time is before the introduction time designated in the received introduction response, and still besides a difference between the introduction time designated in the received introduction response and the current time is equal to or smaller than a difference between the interval time period and the margin time period.

7. The introducing system according to claim 1,
wherein in each of the plurality of terminal devices, the predetermined user report display condition is satisfied in a case where the current time is after when the introduction response is received, besides the current time is before the introduction time designated in the received introduction response, and still besides the number of user names designated in the user report is equal to or larger than a predetermined minimum number.

8. The introducing system according to claim 1, wherein when a number of user names, among the user names stored in the introduction information storage unit, whose associated introduction time is the candidate time stored in the introduction time storage unit exceeds a predetermined first threshold, the introduction time updating unit updates the candidate time to a time that is behind the current time by the predetermined interval time period.

9. The introducing system according to claim 8, wherein in a case where a number of user names, among the user names stored in the introduction information storage unit, whose associated introduction time is a closest time that is ahead of and closest to the candidate time stored in the introduction time storage unit exceeds a predetermined first threshold, and besides a number of user names, among the user names stored in the introduction information storage unit, whose associated introduction time is the candidate time stored in the introduction time storage unit exceeds a predetermined second threshold, the introduction time deciding unit decides the introduction time at which an introduction should be presented to the user having the user name designated in the introduction request, to be the closest time instead of the candidate time stored in the introduction time storage unit.

10. An introducing method that is performed by a server device and a plurality of terminal devices, the server device and the terminal devices being capable of communicating with each other via a computer communication network,
   wherein the server device includes an introduction information storage unit and an introduction time storage unit,
   wherein in the server device, the introduction information storage unit stores a user name of a user who requests introduction of another user and an introduction time at which an introduction should be presented to the user in association with each other, and the introduction time storage unit stores a candidate time that is a candidate for the introduction time,
   wherein the method comprises:
   (a) an introduction request sending step, performed by each of the plurality of terminal devices, of sending an introduction request that designates a user name of a user of the terminal device to the server device in accordance with an instruction of the user;
   (b) an introduction request receiving step, performed by the server device, of receiving the introduction request sent by each of the plurality of terminal devices;
   an introduction time deciding step, performed by the server device, of, when the introduction request is received, deciding the introduction time at which an introduction should be presented to the user having the user name designated in the introduction request, to be the candidate time stored in the introduction time storage unit;
   an introduction information adding step, performed by the server device, of, when the introduction time is decided, additionally storing the user name and the introduction time in association with each other in the introduction information storage unit;
   an introduction response sending step, performed by the server device, of sending an introduction response that designates the decided introduction time to the terminal device that has sent the introduction request;
   a user information acquiring unit, performed by the server device, of acquiring a number of user names stored in the introduction information storage unit when the introduction information storage unit is updated;
   a user report sending step, performed by the server device, of sending a user report that designates the acquired number of user names to each terminal device, among the plurality of terminal devices, that is used by any user having the user name stored in the introduction information storage unit;
   (c) an introduction response receiving step, performed by each of the plurality of terminal devices, of receiving the introduction response sent by the server device;
   a user report receiving step, performed by each of the plurality of terminal devices, of receiving the user report sent by the server device;
   a displaying step, performed by each of the plurality of terminal devices, of displaying a difference between the introduction time designated in the received introduction response and a current time until the current time becomes the introduction time, and when the user report is received and in a case where a predetermined user report display condition is satisfied, displaying the number of user names designated in the user report;
   (d) an extracting/deleting step, performed by the server device, of extracting from the introduction information storage unit any user names whose associated introduction time is equal to or behind the current time among the user names stored in the introduction information storage unit, and deleting the extracted user names from the introduction information storage unit;
   a grouping step, performed by the server device, of classifying the extracted user names into one or a plurality of group(s);
   an introduction report sending step, performed by the server device, of sending to each terminal device that is used by any user having the user name that belongs to the classified one group or any of the plurality of classified groups, an introduction report that designates the user name(s) of another or the other user(s) belonging to that group;
   (e) an introduction report receiving step, performed by each of the plurality of terminal devices, of receiving the introduction report sent by the server device; and
   (f) an introduction time updating step, performed by the server device, of, when the current time becomes a time that is ahead of the candidate time stored in the introduction time storage unit by a predetermined margin time period, updating the candidate time to a time that is behind by a predetermined interval time period that is longer than the margin time period, and
   wherein (g) in each of the plurality of terminal devices, the predetermined user report display condition is satisfied in a case where the current time is after when the introduction response is received, and besides, the current time is before the introduction time designated in the received introduction response.

11. A computer-readable information recording medium that stores a program containing: a server program that controls a server computer to function as a server device; and a terminal program that controls each of a plurality of terminal computers as a terminal device, the terminal computers being capable of communicating with the server computer via a computer communication network,
   wherein (a) the server program controls the server computer to function as:

an introduction information storage unit that stores a user name of a user who requests introduction of another user and an introduction time at which an introduction should be presented to the user in association with each other; and an introduction time storage unit that stores a candidate time that is a candidate for the introduction time, wherein (b) the terminal program controls each of the plurality of terminal computers to function as an introduction request sending unit that sends an introduction request that designates a user name of a user of the terminal device to the server device in accordance with an instruction of the user, wherein (c) the server program further controls the server computer to function as:

an introduction request receiving unit that receives the introduction request sent by each of the plurality of terminal devices;

an introduction time deciding unit that, when the introduction request is received, decides the introduction time at which an introduction should be presented to the user having the user name designated in the introduction request, to be the candidate time stored in the introduction time storage unit;

an introduction information adding unit that, when the introduction time is decided, additionally stores the user name and the introduction time in association with each other in the introduction information storage unit;

an introduction response sending unit that sends an introduction response that designates the decided introduction time to the terminal device that has sent that introduction request;

a user information acquiring unit that acquires a number of user names stored in the introduction information storage unit when the introduction information storage unit is updated; and a user report sending unit that sends a user report that designates the acquired number of user names to each terminal device, among the plurality of terminal devices, that is used by any user having the user name stored in the introduction information storage unit, wherein (d) the terminal program further controls each of the plurality of terminal computers to function as:

an introduction response receiving unit that receives the introduction response sent by the server device;

a user report receiving unit that receives the user report sent by the server device; and a display unit that displays a difference between the introduction time designated in the received introduction response and a current time until the current time becomes the introduction time, and when the user report is received and in a case where a predetermined user report display condition is satisfied, displays the number of user names designated in the user report, wherein (e) the server program further controls the server computer to function as:

an extracting/deleting unit that extracts from the introduction information storage unit any user names whose associated introduction time is equal to or behind the current time among the user names stored in the introduction information storage unit, and deletes the extracted user names from the introduction information storage unit;

a grouping unit that classifies the extracted user names into one or a plurality of group(s); and an introduction report sending unit that sends to each terminal device that is used by any user having the user name that belongs to the classified one group or any of the plurality of classified groups, an introduction report that designates the user name(s) of another or the other user(s) belonging to that group, wherein (f) the terminal program further controls each of the plurality of terminal computers to function as an introduction report receiving unit that receives the introduction report sent by the server device, wherein (g) the server program further controls the server computer to function as an introduction time updating unit that, when the current time becomes a time that is ahead of the candidate time stored in the introduction time storage unit by a predetermined margin time period, updates the candidate time to a time that is behind by a predetermined interval time period that is longer than the margin time period, and wherein (h) the terminal program controls the predetermined user report display condition to be satisfied in each of the plurality of terminal computers in a case where the current time is after when the introduction response is received, and besides, the current time is before the introduction time designated in the received introduction response.

12. A program stored on a computer-readable information recording medium comprising: a server program that controls a server computer to function as a server device; and a terminal program that controls each of a plurality of terminal computers as a terminal device, the terminal computers being capable of communicating with the server computer via a computer communication network, wherein (a) the server program controls the server computer to function as:

an introduction information storage unit that stores a user name of a user who requests introduction of another user and an introduction time at which an introduction should be presented to the user in association with each other; and an introduction time storage unit that stores a candidate time that is a candidate for the introduction time, wherein (b) the terminal program controls each of the plurality of terminal computers to function as an introduction request sending unit that sends an introduction request that designates a user name of a user of the terminal device to the server device in accordance with an instruction of the user, wherein (c) the server program further controls the server computer to function as:

an introduction request receiving unit that receives the introduction request sent by each of the plurality of terminal devices;

an introduction time deciding unit that, when the introduction request is received, decides the introduction time at which an introduction should be presented to the user having the user name designated in the introduction request, to be the candidate time stored in the introduction time storage unit;

an introduction information adding unit that, when the introduction time is decided, additionally stores the user name and the introduction time in association with each other in the introduction information storage unit;

an introduction response sending unit that sends an introduction response that designates the decided introduction time to the terminal device that has sent that introduction request;

a user information acquiring unit that acquires a number of user names stored in the introduction information storage unit when the introduction information storage unit is updated; and a user report sending unit that sends a user report that designates the acquired number of user names to each terminal device, among the plurality of terminal devices, that is used by any user having the user name stored in the introduction information storage unit, wherein (d) the terminal program further controls each of the plurality of terminal computers to function as:

an introduction response receiving unit that receives the introduction response sent by the server device;

a user report receiving unit that receives the user report sent by the server device; and a display unit that displays a difference between the introduction time designated in the received introduction response and a current time until the current time becomes the introduction time, and when the user report is received and in a case where a predetermined user report display condition is satisfied, displays the number of user names designated in the user report, wherein (e) the server program further controls the server computer to function as:

an extracting/deleting unit that extracts from the introduction information storage unit any user names whose associated introduction time is equal to or behind the current time among the user names stored in the introduction information storage unit, and deletes the extracted user names from the introduction information storage unit;

a grouping unit that classifies the extracted user names into one or a plurality of group(s); and an introduction report sending unit that sends to each terminal device that is used by any user having the user name that belongs to the classified one group or any of the plurality of classified groups, an introduction report that designates the user name(s) of another or the other user(s) belonging to that group, wherein (f) the terminal program further controls each of the plurality of terminal computers to function as an introduction report receiving unit that receives the introduction report sent by the server device, wherein (g) the server program further controls the server computer to function as an introduction time updating unit that, when the current time becomes a time that is ahead of the candidate time stored in the introduction time storage unit by a predetermined margin time period, updates the candidate time to a time that is behind by a predetermined interval time period that is longer than the margin time period, and wherein (h) the terminal program controls the predetermined user report display condition to be satisfied in each of the plurality of terminal computers in a case where the current time is after when the introduction response is received, and besides, the current time is before the introduction time designated in the received introduction response.

* * * * *